Aug. 30, 1927.
H. MILLER
1,640,710
ELECTRON EMITTING CATHODE AND PROCESS OF PREPARING THE SAME
Filed March 1, 1926
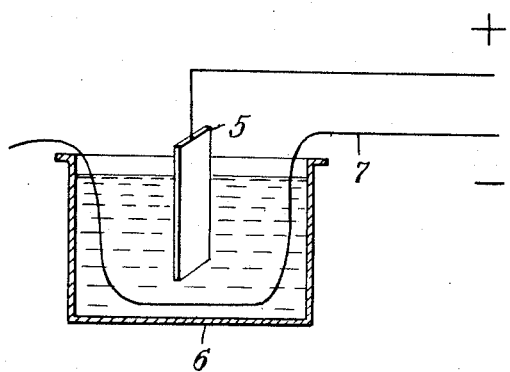
INVENTOR
Henry Miller
BY
Pennie, Davis, Marvin & Edmonds
ATTORNEY Patented Aug. 30, 1927.

1,640,710

UNITED STATES PATENT OFFICE.

HENRY MILLER, OF NEWARK, NEW JERSEY, ASSIGNOR TO HAZELTINE CORPORATION, OF JERSEY CITY, NEW JERSEY, A CORPORATION OF DELAWARE.

ELECTRON EMITTING CATHODE AND PROCESS OF PREPARING THE SAME.

Application filed March 1, 1926. Serial No. 91,455.

It has long been recognized that filaments coated with compounds of the alkali-earth group are very efficient as electron-emitters. Such coated filaments have been expensive to manufacture owing to the difficulty encountered in applying the coatings to the filament. Also such coated filaments have not proved to be entirely satisfactory due to the fact that the coatings frequently chip off with the result that emission falls off very seriously.

The main feature of the invention is the use of a colloid solution of one or more of the alkali-earth metals in preparing the electron-emitting coating of a filament. A further feature of the invention is the use of the phenomenon of electrophoresis in the coating of electron-emitting cathodes.

Other features of the invention reside in the steps of preparing the earth alkaline compounds for application to the filament.

In all of these filaments made according to this invention, it is desirable to obtain a coating which is in large part an oxide or oxides of calcium, barium or strontium. In following out this process, oxides of calcium, barium, and strontium may be used singly or in mixtures of two, or all of them. Also hydroxides of calcium, barium or strontium, either singly or in combination or the hydroxides may be combined with the oxides of calcium, strontium and barium. Likewise, carbonates of calcium, strontium and barium, either singly or in combination, may be employed or they may be used together with oxides of these alkali-earth metals.

In preparing the coatings the oxide or oxides selected are ground dry in a colloid mill to form a powder of very small particle size. This powder is then placed in methyl-alcohol ($CH_3OH$) wherein the powder in large part remains in suspension. Carbon dioxide is then bubbled through the liquid containing the suspended powder until a jelly-like material or mass is formed. This jelly, after standing for some time, dissolves, and the solution may be ground again. These two operations may be repeated several times to derive a material of the proper degree of dispersion and consistency. It may even be permitted to pass the limit of solubility and to work with mixtures of colloids and suspended particles, e. g. carbonates.

A filament which may be of platinum, platinum alloyed with iridium or nickel, tungsten, or other similar retractory materials, is dipped or drawn through a trough containing the solution which has been prepared in the manner just described. This results in the precipitation of the colloid or mixture of colloidal and suspended matter as a thin uniform material, which adheres or sticks tightly to the filament. After drying, the filament is either baked in a furnace at a temperature from 100° to 1200° C. or heated by passing an electric current through it.

Instead of relying on precipitation by dipping only, use may be made of an electric current between a platinum electrode, such as 5, suspended in a trough 6, containing the solution which is to form the coating and the filament to be coated, which forms the other electrode. In this way the colloidally dissolved or suspended particles move towards the filament where they form a uniform deposit in accordance with the phenomenon of electrophoresis.

As a further step, it may be desirable, under certain conditions, to employ suitable organic compounds, such as benzene, which may be added to the solution in order to change its viscosity, reverse its polarity, control the speed of drying, control the sintering and baking, or to produce finely divided carbon within the coating.

As a further refinement of this last described process, graphite or charcoal powder or a colloidal graphite solution is mixed with the barium carbonate or strontium carbonate solution, one part of carbon to three parts by weight of the carbonate. The solution may be applied to the filament either by dipping or by electrophoresis, after which the coated filament is heated to reduce the carbonate to an oxide. The carbon present in the filament lowers the temperature at which the carbonate disintegrates into the oxide.

As illustrating a specific method of carrying out the invention, 20 grams of barium oxide carefully ground were mixed with 50 grams of alcohol, carbon dioxide was then bubbled through this liquid for two hours forming a colloidal barium carbonate jelly with a layer of solid-formed carbonate on the bottom of the container. A jelly of strontium carbonate was also formed in the same manner after which one part of barium carbonate jelly and three parts of the strontium carbonate jelly were dissolved in alcohol and carefully mixed. A platinum filament ten mils wide and one-half mil thick was then dipped in the solution forty times and after each dipping heated to 150° C. to evaporate the alcohol and then it was heated to 900° C. to reduce the carbonates. The filament was then mounted in a vacuum tube with the usual grid and plate electrodes and the filament was heated to 1300° C. while the vacuum tube was being evacuated.

According to a slightly different method of carrying out the invention the liquid prepared by dissolving one part of barium jelly and three parts of calcium jelly was applied to a filament of the above-mentioned dimensions by electrophoresis, the filament being immersed in the liquid with a platinum electrode one-half inch wide and one-half mil thick and a difference of potential of about ten volts developed between the filament and the electrode with the filament negative. The filament was left in the solution for about one-half hour after which it was heated to 150° C. to evaporate the alcohol and then heated to 900° C. to insure that if any carbonates were present in the coating, they were reduced to oxides and further to insure the removal of all moisture. After this, the filament was mounted in the vacuum tube and heated to about 1300° C. during evacuation of the tube.

I claim:

1. The process of manufacturing an electron emitting cathode which comprises electrically depositing a compound of a metal of the alkali-earth group on a conductor from a colloidal solution, and subsequently subjecting the coating to heat.

2. The process of manufacturing an electron emitting cathode which comprises depositing on a conductor by electrophoresis a compound of a metal of the alkali-earth group, and subjecting said conductor to heat.

3. The process of manufacturing an electron emitting cathode which comprises depositing on a conductor by electrophoresis a compound of an electron emitting material from a colloidal solution of said material, and subjecting said conductor to heat.

4. The process of manufacturing an electron emitting cathode which comprises preparing a solution of a compound of an alkali-earth metal by finely dividing an oxide of said metal, dissolving the ground oxide and bubbling carbon dioxide through the solution to form a carbonate of the metal in colloidal solution, applying the solution to a conductor, and heating the conductor to change the carbonate to an oxide.

5. The process of preparing an electron emitting cathode which comprises preparing a solution of a compound of an alkali-earth metal by finely dividing an oxide of the metal, dissolving the finely divided oxide and bubbling carbon dioxide through the solution to form a carbonate of the metal in colloidal solution, applying the solution to a conductor by electrophoresis, and heating the conductor to change the carbonate to an oxide.

6. The process of manufacturing an electron emitting cathode which comprises preparing a solution of two or more compounds of alkali-earth metals by finely dividing oxides of the metals, dissolving the finely divided oxides and bubbling carbon dioxide through the solution to form carbonates of the metals in colloidal solution, applying the solution to a conductor, and heating the conductor to change the carbonates to oxides.

7. The process of manufacturing an electron emitting cathode which comprises preparing a solution of compounds of alkali-earth metals by finely dividing barium oxide, dissolving it in an alcohol and bubbling carbon dioxide through the solution to form a colloidal jelly, also finely dividing strontium oxide, dissolving it and bubbling carbon dioxide through the strontium oxide solution to form a colloidal jelly, mixing the two jellies, then dissolving the mixed jellies, applying them to a conductor, and subsequently heating the conductor.

8. The process of preparing an electron emitting cathode which comprises preparing a solution of a compound of an alkali-earth metal by finely dividing an oxide of the metal, dissolving it in an alcohol and bubbling carbon dioxide therethrough to form a carbonate in colloidal solution, applying the solution to a conductor, and heating the conductor to change the carbonate to an oxide.

9. The process of manufacturing an electron emitting cathode which comprises depositing on a conductor by electrophoresis a compound of an alkali-earth metal from a colloidal solution of said metal containing an organic compound, and subjecting said conductor to heat.

In testimony whereof I affix my signature.

HENRY MILLER.